June 24, 1930. A. W. SCHWEIBOLD 1,765,623
LATHER RUBBER
Filed Oct. 5, 1929

Inventor
Alvin W. Schweibold
Attorney

Patented June 24, 1930

1,765,623

UNITED STATES PATENT OFFICE

ALVIN W. SCHWEIBOLD, OF MONROE, MICHIGAN

LATHER RUBBER

Application filed October 5, 1929. Serial No. 397,509.

My invention has for its object to provide a lathering instrument which is so constructed that it will efficiently rub the lather into the pores of the skin and particularly about the hair close to the skin preparatory to shaving. The invention particularly provides a hard ribbed or corrugated member that is so formed that the lather will not be wiped off of the skin but will be worked into the hair substantially close to the skin to produce softening of the hair where it is to be cut by a razor blade.

The invention may be contained in structures that vary in their details and, to illustrate a practical application of the invention, I have selected a lather rubber containing the invention and shall describe it hereinafter. The rubber selected for purpose of illustration is shown in the accompanying drawing.

Figure 1:
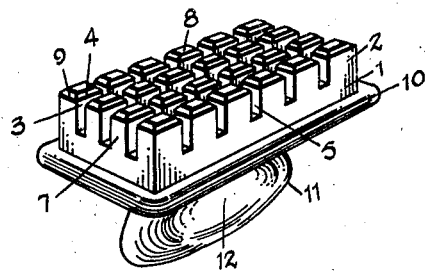
Figure 2:
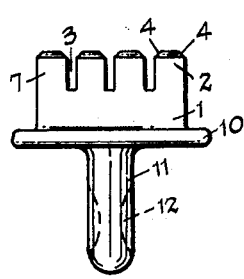
Figure 3:
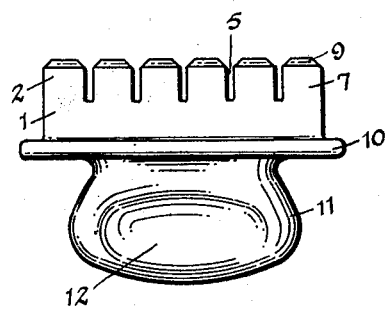

Fig. 1 illustrates a perspective view of the lather rubber. Fig. 2 is an end view. Fig. 3 is a side view.

The lather rubber 1 is preferably formed of a hard material, such as wood, a molded composition of rubber. It is formed to have a plurality of ribs or ridges 2 produced by a plurality of parallel cuts 3 along its face. The upper end portions have inclined surfaces 4 and thereby form parallel ridges or ribs. The rubber 1 is, preferably, provided with a plurality of cross cuts 5 across its face to form the projecting parts 7. The end surfaces 8 of each of the projecting parts are located in the plane of the corresponding surfaces of the other projecting parts. The flat surface of each projecting part is surrounded by the inclined surfaces 4 and 9. The surfaces 4 and 9 form beveled edges or corners at the outer ends of each of the projections 7, which operate to direct the skin beneath the plane surfaces of the ends of the protruding parts by reason of their inclination to variable configuration of the surface of the skin. When, therefore, the rubber 1 is placed on the skin, the skin may be pressed by the closely positioned flat surfaces 8 of the projecting parts. The projecting parts will act as small fingers having the end surfaces 8, and the surfaces 4 and 9, that are inclined to the surface of the skin so that when the rubber 1 is drawn over the user's face, the skin will readily slide beneath the ends of the projecting parts and press the warm lather into the pores of the skin and about the base of the hair. The narrow spaces between the projecting parts will operate to retain the lather that may be collected by each of the fingers and redistribute it in the proximity of the end surfaces of the projecting parts so that, by continual rubbing, the lather will be worked into the pores of the skin and be located where it will soften the hair relatively close to the skin, where the hair is engaged by the razor blade. The fingers being relatively small and provided with the flat and inclined end surfaces, they will quickly work the lather into the pores. The flat surfaces 8, however, have a sufficient area for preventing abrasion or injury to the skin and so that the effect or feel of the rubber is pleasant as it is moved over the skin. Furthermore, the rubber forms a good massage instrument which is beneficial to the skin in rubbing the lather into the pores of the skin.

Preferably, the rubber is also provided with a flange 10 which prevents the collection of lather on the back of the rubber, the side opposite to that on which the projections 7 are located.

The rubber is also provided with a suitable handle 11 that may be readily gripped with the fingers, preferably with two or three fingers and the thumb, which affords a good grip for manipulating the rubber. If desired, the handle may be provided with concave portions 12 located on opposite sides of the handle which aids in the convenient gripping of the rubber.

Thus, by my invention, rubbing of the soap into the pores of the skin by means of the fingers of the hand, as is commonly done, may be avoided, which is not as effective as the use of the rubber, and necessitates the collection of soap on the hands of the person, which is not agreeable, and, in subsequent shaving operations, has to be washed and removed in order that the razor blade may be manipulated. The rubber thus affords an exceedingly convenient and effective means for rubbing the lather into the pores of the skin and eliminates the necessity of covering the hands with soap in order that the rubbing of the soap may be performed, and removes the possibility of scratching the face with germ-infested finger nails.

I claim:

A lather rubber formed of non-pliable material and having a plurality of projecting parts separated from each other by narrow spaces, the ends of each projecting part having a flat surface in the plane of the other projecting parts and having surfaces surrounding the flat surface inclined to the flat surface and the side surface of the projecting part and a handle part for manipulating the rubber.

In witness whereof I have hereunto signed my name to this specification.

ALVIN W. SCHWEIBOLD.